United States Patent Office 3,661,966
Patented May 9, 1972

3,661,966
BISAMMONIUM COMPOUNDS AND PROCESS FOR PREPARING THEM
Wilhelm Bartmann, Frankfurt am Main, Dieter Duwel, Hofheim, Taunus, Volkmar Georgi, Frankfurt am Main, Erhard Wolf, Hofheim, Taunus, Claus Beermann, Neu-Isenburg, and Franz Landauer, Frankfurt am Main, Germany, assignors to Farbwerke Hoechst Aktiengesellschaft vormals Meister Lucius & Bruning, Frankfurt am Main, Germany
No Drawing. Filed Aug. 4, 1969, Ser. No. 847,451
Claims priority, application Germany, Aug. 9, 1968, P 17 93 166.7
Int. Cl. C07c 125/06
U.S. Cl. 260—482 C
15 Claims

ABSTRACT OF THE DISCLOSURE

Bis-ammonium compounds of the formula

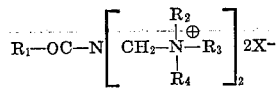

wherein $R_1$ is alkyl having 1 to 6 C-atoms, alkoxy having 1 to 25 carbon atoms, alkenyloxy having 3 to 18 C-atoms, cycloalkoxy having 4 to 8 C-atoms, cycloalkylalkoxy or alkylcycloalkoxy each having 5 to 8 C-atoms, and halogeno-alkoxy or alkoxyalkoxy each having 1 to 6 C-atoms, $R_2$ is alkyl having 1 to 3 C-atoms, $R_3$ is alkyl having 1 to 25 C-atoms, alkenyl having 3 to 18 C-atoms, cycloalkyl having 4 to 8 C-atoms or phenalkyl having 1 to 2 C-atoms in the alkylene radical and optionally one chlorine atom or a nitro group in the phenyl nucleus, $R_4$ is alkyl having 6 to 25 C-atoms or alkenyl having 5 to 25 C-atoms, and $X^-$ is an anion of a non-toxic acid and a process for preparing them are described. The compounds have valuable enthelmintic properties.

The present invention relates to bisammonium compounds of the general formula:

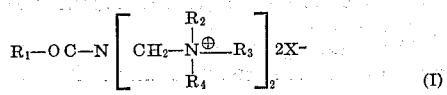
(I)

wherein $R_1$ is alkyl having 1 to 6 C-atoms, alkoxy having 1 to 25 carbon atoms, alkenyloxy having 3 to 18 C-atoms, cycloalkoxy having 4 to 8 C-atoms, cycloalkylalkoxy or alkylcycloalkoxy each having 5 to 8 C-atoms, and halogeno-alkoxy or alkoxyalkoxy each having 1 to 6 C-atoms, $R_2$ is alkyl having 1 to 3 C-atoms, $R_3$ is alkyl having 1 to 25 C-atoms, alkenyl having 3 to 18 C-atoms, cycloalkyl having 4 to 8 C-atoms or phenalkyl having 1 to 2 C-atoms in the alkylene radical and optionally one chlorine atom or a nitro group in the phenyl nucleus, $R_4$ is alkyl having 6 to 25 C-atoms or alkenyl having 5 to 25 C-atoms, and $X^-$ is an anion of a non-toxic acid.

Furthermore, the present invention relates to a process for the preparation of the above mentioned compounds, which process comprises reacting bishalogeno-methyl compounds of the formula $$R_2OC-N(CH_2X)_2 \quad (II)$$

with tertiary amines of the formula $$NR_2R_3R_4 \quad (III)$$

and converting the compounds obtained, if desired or required, into the salts of other physiologically compatible acids. The following scheme illustrates the process of the invention:

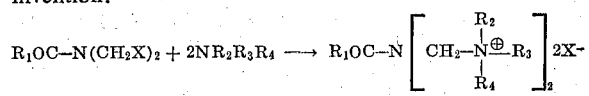

It is known that ammonium salts having aminal structure, for example

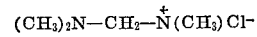

are subject to hydrolysis and are thermally unstable (H. Böhme and assistants, Ann. 705, 147–153 (1967); Ann. 595, 169 (1955)). In accordance with the literature secondary amines can be reacted with the above mentioned bis-halogeno-methyl compounds only under very mild conditions (at temperatures below 0° C.) to form unstable quaternary ammonium salts. These salts decompose upon heating, for example, when recrystallized, the secondary amine utilized being regenerated therein and being isolated as a hydrochloride.

Now, we have surprisingly found that the bisammonium salts obtained from the above N-bis-halogeno-methyl compounds with tertiary amines are thermally stable and are not hydrolyzed. Since the quaternation has to be carried out in aprotic solvents because of the high reactivity of the N-halogeno-methyl compounds, and since the tertiary amines are more strongly basic in these solvents than the secondary amines (cf. H. A. Staab "Einführung in die Theoertische Anorganische Chemie" (1959), S. 631, and H. Becker "Einführung in die Elektronentheorie Organischer Chemischer Reaktionen," second edition, Berlin 1965, S. 61–64), it was to be expected that the bisammonium salts of tertiary amines would be even more unstable than those of secondary amines, for it had to be assumed that the elimination of a proton could be effected more easily when the proton-accepting amine is more basic.

The bishalogeno-methyl compounds of the Formula II serving as starting materials may be prepared in known manner, preferably by reacting carbamoyl compounds of the formula $R_1OC-NH_2$ with para-formaldehyde and an organic or inorganic acid halide. It is especially advantageous to use N-bischloromethyl compounds.

In these starting materials, $R_1$ may have, for example, the following meanings: n-pentyloxy, dodecyloxy, stearyloxy, crotyloxy, oleyloxy, cyclopentyloxy, cycloheptyloxy, cyclooctyloxy, 4-methylcyclohexyloxy, cyclohexylmethyloxy, 1,4-dichlorobutoxy, 3-bromopropoxy, 2,3-dibromopropoxy, ethoxyethoxy, or 4-ethoxybutoxy. When $R_1$ is alkyl, methyl is preferably used.

As tertiary amines used in the reaction, there may be mentioned, for example: methylethylbehenylamine, didodecylmethylamine, diethyl-dodecylamine, methyl-dodecyl-cyclohexylamine, distearylmethylamine, methyl-propyl-dodecylamine, methylcrotyl-undecylamine, and industrially obtainable tertiary amines such as di-coconutfat-methyl-amine, or palm-kernel-fat-dimethylamine. Instead of uniform tertiary amines, mixtures of different tertiary amines may also be used.

The reaction is preferably carried out at temperatures in the range of from −40 to 100° C. It is more or less exothermic, according to the reactivity of the halogenomethyl compounds. The reaction is preferably carried out in an aprotic solvent, such as acetonitrile, tetrahydrofurane or ethyl acetate. It may, however, also be carried out without the use of solvents.

The ammonium salts are usually prepared by dropwise adding to a solution of the bishalogeno-methyl compounds in a suitable solvent, such as ethyl acetate or acetonitrile, and equivalent amount of the tertiary amine, optionally also in a solvent. If required, the reaction mixture has to be cooled. The reaction may also be carried out vice versa with the same success.

When the reaction is finished, the mixture is stirred until the reaction product has completely crystallized. It may be advantageous to add a solvent in which the bisammonium compound is not very soluble in order to improve crystallization. The crystals are then suction-filtered and may be recrystallized from a suitable solvent or mixture of solvents.

The products of the invention are white crystals which are soluble in water, giving an almost neutral reaction. The compounds are also soluble in organic solvents, depending on the radicals R used. From the ammonium halides initially obtained, there may be prepared, in known manner, the salts of other physiologically compatible acids, for example by anion-exchangers or by formation of reciprocal pairs of salt. As such salts, there may be used, for example, sulfates, phosphates, tartrates, citrates, maleinates, acetates, formiates, benzoates sulfaminates. The products may be easily purified by recrystallization from suitable solvents, for example from ethylacetate or acetonitrile. The new bisammonium compounds according to the invention have an excellent anthelmintic effect, particularly against Nematospiroides dubius, a small intestine parasite of many domestic animals which cannot be or can only insufficiently be combated by known anthelmintics. The following table illustrates the excellent effect and good compatibility of the products of the present invention:

TABLE 1

The following compounds of the formula

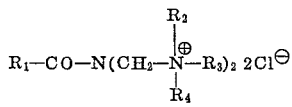

were tested with respect to their effectiveness against Nematospiroides dubius. The last column indicates the chemotherapeutical index at an efficiency of more than 90%.

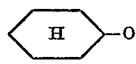

¹ Industrial dimethyl fat amine (C₈–C₁₈) average molecular weight 226.
² Industrial dimethyl fat amine (C₁₂–C₁₈) average molecular weight 238.

The anthelmintic efficiency of the products was tested in the following manner: mice having been raised free from worms and having a bodyweight of about 20 g., were infected orally with Nematospiroides dubius. At the end of the prepatent period the animals were treated orally once to three times, at intervals of 24 hours each, with 150 to 400 mg./kg. each of the substances. One week after the last treatment, the animals were killed and dissected and the worms which were found in the intestinal tract were counted, and compared with the number of worms found in untreated control animals. The effectiveness of the substances is indicated as "therapeutical index," the term "therapeutical index" being identified as the ratio maximum tolerable dose/minimum curative dose.

As is shown in the following Table 2, known anthelmintics are ineffective or have very little effect against Nematospiroides dubius (substances 1–4), or they are much less compatible than the substances of the present invention, as can be seen from the chemotherapeutical indices (substances 5–7).

TABLE 2

| No. | Substance | Efficiency, percent | Chemotherapeutical index |
|---|---|---|---|
| 1 | Phenothiazin | 0 | |
| 2 | Piperazin | 65 | 1–2 |
| 3 | Benzyldimethyl-2-phenoxyethylammonium-3-hydroxy-2-naphthoat (bephenium) | 0 | |
| 4 | 2-(β'-methoxyethyl)-pyridin (methyridin) | 0 | |
| 5 | 2-(4'-thiazolyl)-benzimidazol (thiabendazol) | >90 | 1–2 |
| 6 | (2,3,5,6-tetrahydro-6-phenylimidazo [2,1-b]-thiazolhydrochloride (tetramisol) | >90 | 1 |
| 7 | 1,4,5,6-tetrahydro-2-[2-thienyl)-vinyl-]-pyrimidin-tartrat (pyrantel) | >90 | 1 |

Because of their anthelmintic activity, the compounds of the invention are useful medicaments for the treatment of diseases caused by parasites of the intestinal tract, especially in domestic animals. They can be applied orally or parenterally (subcutaneously). Oral application can be attained by mixing the compounds, preferably in the form of pellets, with the fodder of the animals or by dissolving them in the drinking water. They can, however, also be applied in the form of tablets or dragées containing in addition to the active ingredient, the usual pharmaceutically inactive additives.

The following examples illustrate the present invention but they are not intended to limit it thereto.

Example 1

150 g. (0.704 mol) of N-dimethyl-N-dodecylamine were added dropwise, while cooling with water, to a solution of 75 g. (0.35 mol) of N,N - bischloromethyl-carbamic acid-n-butylester in 250 ml. of absolute acetonitrile whereby the interior temperature was kept at about 40° C. The ammonium salt started crystallizing during the addition of the amine. Stirring of the reaction mixture was continued for 5 hours after removing the bath. After cooling, the bisammonium salt was suction-filtered, washed with a small amount of acetonitrile and dried. The N,N-bis - (dimethyl - dodecyl-ammoniochlorido-methyl)-carbamic acid-n-butylester was obtained in a yield of 85% (190 g.) in the form of hygroscopic crystals, which dissolve in water with pH 6 and are soluble also in alcohol, chloroform or dimethylformamide. The compound can be recrystallized from acetonitrile. $C_{35}H_{75}Cl_2N_3O_2$ (641)—Calculated (percent): C, 66.0; H, 11.7; N, 6.55; Volhard-Cl, 11.2. Found (percent): S, 65.8; H, 12.0; N, 6.30; Volhard-Cl, 10.8.

Example 2

A mixture of 10 g. of dimethyldodecylamine (0.0467 mol) and 14 g. of dimethyl-octadecylamine (0.0471 mol) was added within 15 minutes to a solution of 10 g. of N, N-bis-chloromethyl carbamic acid-n-butyl ester (0.0467 mol) in 25 ml. of acetonitrile, while cooling with ice. The mixture was stirred for 10 hours at room temperature. The crystals were suction-filtered, washed with acetonitrile and dried. The yield was 27 g.=79.5% of the theory. The compound dissolved in water giving a neutral reaction.

Volhard-Cl calcd. (percent): 9.8. Volhard-Cl found (percent): 9.75.

Example 3

42.6 (0.2 mol) of dodecyldimethylamine were suspended in 120 ml. of acetonitrile and a solution of 32.6 g. (0.1 mol) of N-bis-chloromethyl-carbamic acid-dodecyl-ester in 40 ml. of acetonitrile was added thereto at room temperature. Then the mixture was stirred for 2 hours, left over night and diluted with 200 ml. of acetic acid-ethyl acetate. After short cooling, the crystals were suction-filtered and dried. The crude product was recrystallized from acetonitrile. There were obtained 56 g.=74% of the theory of N,N-bis-(dodecyl-dimethyl-ammoniochlorido-methyl)-carbamic acid-dodecyl ester in the form of colorless, hygroscopic crystals, which were soluble in water at a pH value of 6 and were soluble also in alcohol, chloroform and dimethylformamide.

$C_{43}H_{91}Cl_2N_3O_2$ (molecular weight 753.1)—Calculated (percent): C, 68.6; H, 12.2; N, 5.6; Cl, 9.4. Found (percent): C, 68.4; H, 12.3; N, 5.5; Cl, 9.6.

Example 4

17 g. (0.05 mol) of an industrial dimethyl-fat amine having an average molecular weight of 340, the fat radical thereof being in the range of from 20 to 22 carbon atoms, were introduced into 60 ml. of absolute benzene and 8.2 g. (0.025 mol) of N-bis-chloromethyl-carbamic acid-dodecyl ester in 30 ml. of absolute benzene were added dropwise at room temperature. The reaction mixture was stirred for 2 hours and left at room temperature for 10 hours. After suction-filtering and drying of the crystals, 15.5 g.=61.5% of the corresponding bisammonium salt were obtained. This compound was soluble in water having a pH of 6 as well as in alcohol, chloroform and dimethylformamide.

Volhard-Cl calcd. (percent): 7.1. Volhard-Cl found (percent): 7.0.

Example 5

9.32 g. (0.0286 mol) of N-bischloro-methyl-carbamic acid-dodecyl ester were added, at room temperature, to 21 g. (0.0572 mol) of didodecyl-methylamine, while stirring vigorously. Reaction started immediately, the temperature rising to 42° C. The reaction product solidified upon cooling and formed a wax-like mass, which was filtered off by suction and washed with a small amount of acetonitrile. 29 g.=95% of the theory of N,N-bis-[N′,N′-bis - dodecyl-methyl ammoniochlorido-methyl-]-carbamic acid-dodecyl ester were obtained.

$C_{65}H_{135}Cl_2N_3O_2$ (molecular weight 1060)—Volhard-Cl calcd. (percent): 6.7. Found (percent): 6.98.

While using the methods described in the above examples, the following compounds of the type

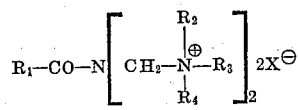

were prepared.

TABLE

| Number | $R_1$ | $NR_2R_3R_4$ | X | Volhard-Cl (percent) Calculated | Found |
|---|---|---|---|---|---|
| 1 | $CH_3$ | $H_{25}C_{12}N(CH_3)_2$ | Cl | 12.2 | 11.8 |
| 2 | $CH_3$ | $H_{37}C_{18}N(CH_3)_2$ | Cl | 9.45 | 9.2 |
| 3 | $CH_3O$ | $H_{37}C_{18}N(CH_3)_2$ | Cl | 9.25 | 9.0 |
| 4 | $C_2H_5O$ | $H_{25}C_{12}N(CH_3)_2$ | Cl | 11.6 | 11.2 |
| 5 | $Cl-CH_2-CH_2-O$ | $H_{25}C_{12}N(CH_3)_2$ | Cl | 11.0 | 10.7 |
| 6 | $CH_3-O-CH_2-CH_2-O$ | $H_{25}C_{12}N(CH_3)_2$ | Cl | 11.0 | 10.4 |
| 7 | $CH_2=CH-CH_2-O$ | $H_{25}C_{12}N(CH_3)_2$ | Cl | 11.3 | 11.0 |
| 8 | $CH_2-CH-CH_2-O$ with Cl, Cl | $H_{25}C_{12}N(CH_3)_2$ | Cl | 10.2 | 10.3 |
| 9 | $CH_2-CH-CH_2-O$ with Cl, Cl | $H_{37}C_{18}N(CH_3)_2$ | Cl | 8.2 | 8.4 |
| 10 | $n-H_9C_4-O$ | $CH_2=CH-(CH_2)_3-N(CH_3)_2$ | Cl | 18.25 | 18.00 |
| 11 | $H_9C_4-O$ | $H_{13}C_6N(CH_3)_2$ | Cl | 15.0 | 14.9 |
| 12 | $n-H_9C_4-O$ | $H_{17}C_8-N(CH_3)_2$ | Cl | 13.45 | 13.30 |
| 13 | $n-H_9C_4-O$ | (¹) | Cl | 10.8 | 10.85 |
| 14 | $n-H_9C_4-O$ | $H_{21}C_{10}-N(CH_3)_2$ | Cl | 12.2 | 11.9 |
| 15 | $n-H_9C_4-O$ | $CH_2=CH-(CH_2)_9-N(CH_3)_2$ | Cl | 11.6 | 11.5 |
| 16 | $n-H_9C_4-O$ | $H_{25}C_{12}-N(CH_3)_2$ | Cl | 11.1 | 10.7 |
| 17 | $n-H_9C_4-O$ | (²) | Cl | 10.3 | 10.4 |
| 18 | $n-H_9C_4-O$ | $H_{25}C_{12}-N(CH_3)_2$ | Br | ⁴ 21.92 | ⁴ 22.18 |
| 19 | $n-H_9C_4-O$ | $H_{33}C_{16}-N(CH_3)_2$ | Cl | 9.7 | 9.4 |
| 20 | $n-H_9C_4-O$ | ½ $H_{25}C_{12}-N(CH_3)_2$ / ½ $H_{37}C_{18}-N(CH_3)_2$ | Cl | 9.8 | 9.75 |
| 21 | $n-H_9C_4-O$ | $H_{25}C_{12}-N-CH_2-C_6H_5$ with $CH_3$ | Cl | 9.0 | 9.1 |
| 22 | $n-H_9C_4-O$ | $H_{37}C_{18}-N(CH_3)_2$ | Cl | 8.8 | 8.3 |
| 23 | $n-H_9C_4-O$ | (³) | Cl | 7.95 | 7.5 |
| 24 | $i-C_4H_9-O$ | $H_{25}C_{12}-N(CH_3)_2$ | Cl | 11.1 | 10.85 |
| 25 | $i-C_4H_9-O$ | $H_{37}C_{18}-N(CH_3)_2$ | Cl | 8.8 | 8.5 |
| 26 | $Cl-CH_2-(CH_2)_3-O$ | $H_{25}C_{12}-N(CH_3)_2$ | Cl | 10.5 | 10.5 |
| 27 | $H_5C_2-CH-CH_2-O$ with $C_2H_5$ | $H_{25}C_{12}-N(CH_3)_2$ | Cl | 10.6 | 10.5 |
| 28 | $H_5C_2-CH-CH_2-O$ with $C_2H_5$ | $H_{37}C_{18}-N(CH_3)_2$ | Cl | 8.5 | 8.4 |
| 29 | cyclohexyl-O | $H_{25}C_{12}-N(CH_3)_2$ | Cl | 10.7 | 10.5 |
| 30 | cyclohexyl-O | $H_{37}C_{18}-N(CH_3)_2$ | Cl | 8.5 | 8.4 |
| 31 | $n-H_{17}C_8-O$ | $H_{25}C_{12}-N(CH_3)_2$ | Cl | 10.2 | 10.0 |
| 32 | $n-H_{17}C_8-O$ | $H_{37}C_{18}-N(CH_3)_2$ | Cl | 7.35 | 6.9 |

See footnotes at end of table.

TABLE—Continued

| Number | R₁ | NR₂R₃R₄ | X | Volhard-Cl (percent) Calculated | Volhard-Cl (percent) Found |
|---|---|---|---|---|---|
| 33 | H₉C₄—CH—CH₂—O<br>\|<br>C₂H₅ | H₂₅C₁₂—N(CH₃)₂ | Cl | 10.2 | 10.1 |
| 34 | H₉C₄—CH—CH₂—O<br>\|<br>C₂H₅ | H₃₇C₁₈—N(CH₃)₂ | Cl | 8.2 | 8.2 |
| 35 | n-H₂₅C₁₂—O | H₁₃C₆—N(CH₃)₂ | Cl | 12.1 | 12.1 |
| 36 | n-H₂₅C₁₂—O | H₂₁C₁₀—N(CH₃)₂ | Cl | 10.2 | 10.0 |
| 37 | n-H₂₅C₁₂—O | CH₂=CH—(CH₂)₉—N(CH₃)₂ | Cl | 9.8 | 9.6 |
| 38 | n-H₂₅C₁₂—O | H₂₅C₁₂—N(CH₃)₂ | Cl | 9.4 | 9.6 |
| 39 | n-H₂₅C₁₂—O | H₃₇C₁₈—N(CH₃)₂ | Cl | 7.71 | 7.75 |
| 40 | n-H₂₅C₁₂—O | (³) | Cl | 7.1 | 7.0 |
| 41 | n-H₂₅C₁₂—O | (¹) | Cl | 9.1 | 9.1 |
| 42 | n-H₂₅C₁₂—O | (²) | Cl | 8.9 | 9.0 |
| 43 | n-H₉C₄—O | (H₃₇C₁₈)₂N—CH₃ | Cl | 5.53 | 5.67 |
| 44 | n-H₂₅C₁₂—O | (H₂₅C₁₂)₂N—CH₃ | Cl | 6.7 | 6.98 |

¹ Industrial dimethyl fat amine (C₈–C₁₈) average molecular weight 226.
² Industrial dimethyl fat amine (C₁₂–C₁₈) average molecular weight 238.
³ Industrial dimethyl fat amine (C₂₀–C₂₂) average molecular weight 340.
⁴ Br.

We claim:

1. A bis-ammonium compound of the formula

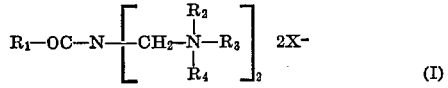

wherein R₁ is alkyl of 1 to 6 carbon atoms, alkoxy of 1 to 25 carbon atoms, alkenyloxy of 3 to 18 carbon atoms, cycloalkoxy of 4 to 8 carbon atoms, cycloalkylalkoxy or alkylcycloalkoxy each of 5 to 8 carbon atoms, or halogenoalkoxy or alkoxyalkoxy each of 1 to 6 carbon atoms, R₂ is alkyl of 1 to 3 carbon atoms, R₃ is alkyl of 1 to 25 carbon atoms, alkenyl of 3 to 18 carbon atoms, cyclohexyl or phenylalkyl with 1 to 2 carbon atoms in the alkylene radical, R₄ is alkyl of 6 to 25 carbon atoms or alkenyl of 5 to 25 carbon atoms, and X⁻ is an anion of a nontoxic acid.

2. The compound defined in claim 1 in which the structural formula represents N,N - bis - (dimethyl-octadecylammoniochlorido - methyl) - carbamic acid - methyl ester.

3. The compound defined in claim 1 in which the structural formula represents N,N-bis-(dodecyl-dimethyl-ammoniochlorido-methyl)-carbamic acid-ethyl ester.

4. The compound defined in claim 1 in which the structural formula represents N,N-bis-(dodecyl-dimethyl-ammoniochlorido-methyl) - carbamic acid - 2 - chlorethyl ester.

5. The compound defined in claim 1 in which the structural formula represents N,N-bis-(dodecyl-dimethyl-ammoniochlorido-methyl)-carbamic acid-allyl ester.

6. The compound defined in claim 1 in which the structural formula represents N,N-bis-dodecyl-dimethyl-ammoniochlorido-methyl)-carbamic acid-n-butyl ester.

7. The compound defined in claim 1 in which the structural formula represents N,N-bis - (dimethyl - octadecylammoniochlorido-methyl) - carbamic acid - n - butyl ester.

8. The compound defined in claim 1 in which the structural formula represents N,N-bis-(dodecyl-dimethyl-ammoniochlorido-methyl)-carbamic acid-isobutyl ester.

9. The compound defined in claim 1 in which the structural formula represents N,N - bis - (dimethyl - octadecylammoniochlorido-methyl) - carbamic acid - isobutyl ester.

10. The compound defined in claim 1 in which the structural formula represents N,N-bis-(dodecyl-dimethyl-ammoniochlorido-methyl)-carbamic acid - 4 - chlorobutyl ester.

11. The compound defined in claim 1 in which the structural formula represents N,N-bis-(dodecyl-dimethyl-ammoniochlorido-methyl) - carbamic acid - 2 - ethylhexyl ester.

12. The compound defined in claim 1 in which the structural formula represents N,N-bis-(dodecyl-dimethyl-ammoniochlorido-methyl)-carbamic acid-cyclohexyl ester.

13. The compound defined in claim 1 in which the structural formula represents N,N-bis-(dodecyl-dimethyl-ammoniochlorido-methyl)-carbamic acid-n-octyl ester.

14. The compound defined in claim 1 in which the structural formula represents N,N-bis-(10-undecenyl-dimethylammoniochlorido-methyl)-carbamic acid - dodecyl ester.

15. A mixture of compounds defined in claim 1 in which the structural formula represents N,N-bis-[(C₈–C₁₈)alkyldimethyl-ammoniochlorido - methyl-] carbamic acid-dodecyl esters.

References Cited

UNITED STATES PATENTS 1,894,162  1/1933  Dalmer et al. _____ 260—482

FOREIGN PATENTS 701,376  1/1965  Canada _____ 260—501.13

LORRAINE A. WEINBERGER, Primary Examiner

P. J. KILLOS, Assistant Examiner

U.S. Cl. X.R.

260—468 C, 471 C, 561 R, 562 R; 424—300, 320